Dec. 10, 1963    J. VOGT    3,113,794
BALL AND SOCKET JOINTS
Filed Feb. 26, 1962
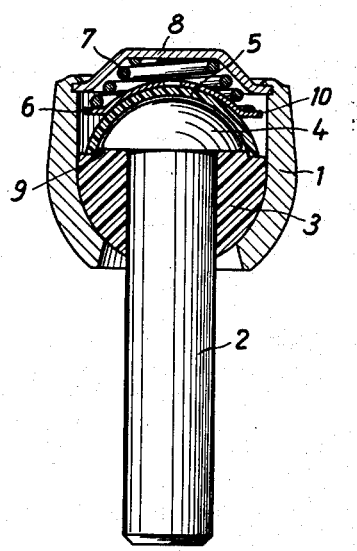

United States Patent Office 3,113,794
Patented Dec. 10, 1963

3,113,794
BALL AND SOCKET JOINTS
Jacob Vogt, Dusseldorf-Oberkassel, Germany, assignor to A. Ehrenreich & Cie, Dusseldorf-Oberkassel, Germany, a German company
Filed Feb. 26, 1962, Ser. No. 175,557
Claims priority, application Germany Feb. 27, 1961
3 Claims. (Cl. 287—87)

This invention relates to ball and socket joints such as those used in motor vehicles for steering linkages and wheel suspensions.

The invention is concerned with joints of the kind, in which the socket is in a housing and the ball, which is part spherical, is carried on a pin which extends into the housing. The ball is rotatable about the axis of the pin and rests in a hollow spherical surface in the housing. The pin has a head forming a shoulder which bears against a surface on the part-spherical ball and a spring force is provided to press the part-spherical surface of the ball into the hollow spherical surface of the housing.

In ball and socket joints of this kind, rocking movements of the pin and rotary movements of the pin relative to the ball are separate from one another. The pin rotates in the ball, so that the rotary movement takes place between said ball and does not produce any movement of the ball within the socket. The ball is, however, moved by the pin when the pin rocks and the ball rocks in the hollow spherical surface of the housing. This rocking of the ball in the housing does not result in any movement of the pin with respect to the ball. The spring loading of the mounting of the pin in the housing hitherto had an effect both on the rotary movement of the joint pin and on the pivoting movement of the joint pin which takes place together with the spherical segment, and obstructed both movements.

The aim of the present invention is to ensure that the rotary movement, which may be required, for example, for steering movements, is not obstructed by the spring loading, so that the pin can readily be rotated and the steering movements are greatly facilitated.

To this end, according to this invention, in a ball and socket joint in which the ball is rotatably carried on a pin which extends into a housing forming the socket, the ball having a part-spherical surface which is pressed by a spring into contact with a complementary surface in the housing and a surface which bears against a shoulder formed by a head on the end of the pin, the spring acts on a cap which extends with a clearance over the head of the pin and rests directly on the ball so that it transmits the spring force directly to the ball and does not act at all on the pin.

A disc is advantageously provided between the loading spring and the cap, and bears against the cap by a surface having the same curvature as the outer surface of said cap. The disc has an edge flange on which the spring acts. The disc forms a sliding surface for the cap and reduces the resistance of the cap to sliding on rocking of the ball.

In this case the outer surface of the spherical segment and the outer surface of the dish-shaped element have the same centre of curvature.

An example of a ball and socket joint in accordance with the invention is illustrated in the accompanying drawing which is a vertical section through the joint. The joint comprises a housing 1 and a pin 2. A ball 3 is mounted on the pin 2 in the housing 1 so as to be rotatable and rockable. The ball 3 rests in a hollow spherical surface in the housing. The pin 2 extends through the ball 3 and is rotatable therein. It has a shoulder formed by a head 4, against which the ball bears.

The head 4 is covered by a cap 5, which has a spherical outer surface and which has a clearance between itself and the head 4. The edge of the cap 5 bears on the ball 3 and engages over a projection 9. The outer surfaces of the cap 5 and the part-spherical outer surface of the ball 3 have the same centre of curvature. The cap 5 complements the ball 3 to form substantially a complete sphere.

A disc 6 bears against the cap 5 and its surface adjacent the cap conforms with that of the cap. A spring 7 bears on a peripheral flange 10 of the disc 6 and its other bearing surface is formed by a housing closure cap 8. The cap 8 is rolled into the housing.

In ball and socket joints known heretofore, the disc 6 bears against the head 4 so that the spring 7 acting upon the disc 6 obstructs both the rotary movement of the pin 2 and the rocking movement of the pin 2. With the construction according to the invention the rotary movement of the pin is not obstructed.

The head 4 may be of any shape.

I claim:
1. A ball and socket joint comprising
a hollow housing having a bore extending therethrough,
said housing having an inturned segmental spherical wall portion at one end of said bore defining a restricted opening,
closure plate means at the other end of said bore,
a ball member in the form of a segmental spherical section having a segmental spherical bearing surface disposed in said housing in bearing engagement with said inturned wall portion of said housing,
said ball member having a cylindrical bore extending therethrough,
a pin extending through the bore of the ball member and having a cylindrical bearing portion freely rotatable therein,
a rounded head on said pin facing said cover means and having a shoulder seated against the inner end of said ball member,
a cap member having a spherical surface form, extending over said pin head in spaced relationship and resting on the inner end of said ball member,
a disc having a spherically rounded portion adapted to engage said spherical surface of said cap
and spring means lodged between said disc and said closure plate means for urging said cap member directly against the end of said ball member to seat said ball member in said segmental spherical wall portion of said housing.
2. A ball and socket joint comprising
a hollow housing having a bore extending therethrough and adapted to receive a pin member having a rounded head,
said housing having an inturned segmental spherical wall portion at one end of said bore defining a restricted opening, an outwardly dished closure plate fixed to said housing at the other end and having a flat base, a ball member in the form of a segmental spherical section defining a flat circular end surface and having a segmental spherical bearing surface disposed in said housing in bearing engagement with said inturned wall portion of said housing, said ball member surrounding said pin member with sufficient clearance to allow rotation of said pin member therein, said pin head having a flat base engaging said flat end surface of said ball member, a spherical cap extending over said rounded pin head in spaced relationship and engaging said inner end of said ball member at its base, a disc member having a spherical center portion conformed to the spherical surface of said cap member and in slideable engagement therewith, said disc member having a peripheral flange outwardly of said spherical center portion, and a coil spring lodged between said flange of said disc member and said flat base of said closure plate for transmitting pressure over said cap member directly to said ball member around said pin head.

3. A ball and socket joint according to claim 1 wherein said ball member and said cap member have the same center of curvature.

References Cited in the file of this patent

UNITED STATES PATENTS

| | | |
|---|---|---|
| 2,110,148 | Gross | Mar. 8, 1938 |
| 2,147,815 | Hufferd et al. | Feb. 21, 1939 |
| 2,912,267 | Latzen | Nov. 10, 1959 |
| 3,068,032 | Van Winsen | Dec. 11, 1962 |

FOREIGN PATENTS

| | | |
|---|---|---|
| 840,176 | Great Britain | July 6, 1960 |